United States Patent [19]

Sardo

[11] Patent Number: 4,857,345
[45] Date of Patent: Aug. 15, 1989

[54] COMPOSITIONS FOR THE TREATMENT OF FRUIT AND VEGETABLES BY THERMAL FOGGING AND PROCESSING METHOD USING SAID COMPOSITION

[75] Inventor: Alberto Sardo, Le Chesnay, France

[73] Assignee: Xeda International, Le Chesnay, France

[21] Appl. No.: 9,038

[22] Filed: Jan. 16, 1987

Related U.S. Application Data

[63] Continuation of Ser. No. 732,431, May 6, 1985, abandoned.

[30] Foreign Application Priority Data

May 9, 1984 [FR] France ................... 84 07148

[51] Int. Cl.$^4$ ............................. A23B 7/156
[52] U.S. Cl. ................... 426/310; 426/654; 426/544; 426/545; 426/546; 426/321; 426/335; 426/333; 426/532
[58] Field of Search ............... 426/310, 654, 544–546, 426/321, 335, 333, 532

[56] References Cited

U.S. PATENT DOCUMENTS

| 2,703,288 | 3/1955 | Worson | 99/222 |
|---|---|---|---|
| 2,738,334 | 3/1956 | Tenney et al. | 252/259 |
| 2,857,332 | 10/1958 | Tenney et al. | 252/359 |
| 2,950,592 | 8/1960 | Frank | 60/35.6 |
| 2,970,430 | 2/1961 | Curtis et al. | 60/35.6 |
| 3,034,904 | 5/1962 | Kleiman | 99/154 |
| 3,052,094 | 9/1962 | Osburn | 60/39.14 |
| 3,151,454 | 10/1964 | Curtis | 60/39.77 |
| 3,239,960 | 3/1966 | Stevens | 43/129 |
| 3,526,518 | 9/1970 | Kleiman | 99/154 |
| 3,526,519 | 9/1970 | Kleinman | 426/310 X |
| 4,030,695 | 6/1977 | Curtis | 251/113 |
| 4,123,558 | 10/1978 | Poapst | 426/310 X |
| 4,226,179 | 10/1980 | Sheldon, III et al. | 426/312 X |

FOREIGN PATENT DOCUMENTS

| 870894 | 3/1942 | France . |
|---|---|---|
| 1346820 | 11/1963 | France . |
| 89250 | 5/1967 | France . |
| 1512203 | 12/1967 | France . |
| 2175518 | 10/1973 | France . |
| 1520980 | 8/1978 | United Kingdom . |

OTHER PUBLICATIONS

Singh et al., *Chemical Abstracts*, vol. 98, No. 3, (Jan., 1983), Abstract No. 15673u.

*Primary Examiner*—Joseph Golian
*Attorney, Agent, or Firm*—Wenderoth, Lind & Ponack

[57] ABSTRACT

The invention relates to a composition for the treatment of fruits and vegetables by thermal fogging. The composition comprises from 2% to 25% by weight of at least one active protective and/or preserving substance, in solution or in dispersion in an aqueous medium containing a mixture of at least two emulsifiers having each an HLB value of 3 to 20, this mixture having an average HLB value of 8 to 15, and the active substance, when it is solid and does not give a true solution in said medium, being in the form of particles smaller than 1 micron.

4 Claims, No Drawings

COMPOSITIONS FOR THE TREATMENT OF FRUIT AND VEGETABLES BY THERMAL FOGGING AND PROCESSING METHOD USING SAID COMPOSITION

This application is a continuation of now abandoned application Ser. No. 732,431, filed May 6, 1985

BACKGROUND OF THE INVENTION

The present invention relates to compositions for the processing of fruit and vegetables by thermal fogging, particularly in enclosures such as storage chambers or greenhouses.

The processing of fruits and vegetables after harvesting may be designed to ensure only protection during the period running from packaging to sale or to ensure also the preservation of the fruit and vegetables in cases where the fruit and vegetables are intended to be warehoused before sale.

In this second case, which is the most general case for apples and pears, potatoes and some other varieties of fruits and vegetables, a treatment is generally carried out on the products in the box.

For this purpose, the boxes are immersed in or sprayed with an aqueous solution containing the various chemical processing materials.

For treatment with insecticides, in the open air, there exist thermal fogging apparatuses which put into the form of a fine mist a liquid insecticide composition by injection of this composition into a hot gas at high speed.

The use of such apparatus to apply treatment substances in enclosures to fruits and vegetables could also be contemplated. However, difficulties are encountered when it is desired, in practice, to use this technique, since the fruit inside stored boxes is difficult to reach and to coat homogeneously. It is essential that the coating should be homogeneous in order that the protection may be correct and that the admissible limits for residues of active substances should not be exceeded. In addition, the substances used for treating fruits and vegetables are generally lipophile organic substances which are practically insoluble in water, often and are the solid state at ambient temperature. Now, the use of solutions in organic solvents for lipophile substances is hardly suitable by reason of the dangers of phytotoxicity, even in the case of careful ventilation of the sites in which the fogging is carried out. In addition, the use of a dispersion of conventional wettable powders does not give a homogeneous coating by reason of the particle size of these powders smaller than (1 micron).

It is an object of the present invention to provide compositions which can be applied by means of thermal fogging equipment, which does not leave dangerous residues in the enclosure where the thermal fogging is carried out and which permits the production of a regular coating on all fruits and vegetables in stored boxes, whatever their position in the storage chamber.

According to the present invention there is provided for this purpose a composition designed for the processing of fruits and vegetables by thermal fogging, characterised in that it comprises from 2 to 25% by weight of at least one active protective and/or preserving substance, in solution or in dispersion in an aqueous medium containing a mixture of at least two emulsifiers each having an HLB value of 3 to 20, this mixture having an average HLB value of 8 to 15 and the active substance, when it is solid and does not give a true solution in said medium, being in the form of particles of less than 1 micron.

By HLB value of the emulsifier, is meant the value of the hydrophile-lipophile balance. In the case of a non-ionic emulsifier, this value is equal to % hydrophile portion by weight: 5. This weight is extrapolatable by similitude to anionic products.

In a first embodiment, the composition according to the present invention comprises from 2 to 6% by weight of active substance, from 5 to 20% by weight of a mixture of at least two emulsifiers having an average HLB value to 8 to 15, the rest being water.

In a second and preferred embodiment of the invention, the composition according to the present invention comprises:

from 2 to 20% by weight (more preferably from 10 to 15% by weight) of active substance,
from 10 to 20% by weight of water,
from 25 to 50% by weight of glycol, and
from 5 to 50% by weight of a mixture of emulsifiers having an average HLB value of 10 to 15.

The glycol is advantageously propylene glycol, although other glycols such as ethylene glycol may be used.

As mixture of emulsifiers, the preferred composition comprises advantageously:

from 8 to 12% by weight of a fatty acid such as oleic acid,
from 14 to 18% by weight of a salt of a fatty acid such as the potassium salt of oleic acid, and optionally,
up to 30% by weight of a mixture of emulsifiers having an average HLB value of 8 to 15.

The mixture of fatty acid and of fatty acid salt may be obtained simply by mixing the fatty acid and a strong base. This mixture acts as a mixture of two emulsifiers, one with HLB of about 3 and the other with an HLB of about 20.

The preferred compositions have the advantage of possessing a reduced water content which permits at the same time the avoidance of two severe cooling of the gases in the thermal fogging apparatus and overheating of the active substances introduced into the thermal fogging apparatus.

The active substances for protection and/or preservation of the fruits and vegetables which are present in the composition according to the invention may be particularly antioxidants such as ethoxyquine, diphenylamine, butylhydroxyanisole,
antigerminating agents, such as chlorophenyl isopropyl carbamate,
fungicides such as thiabendazole, iprodione, sec.butylamine.

It is to be noted that there are obtained, according to the nature of the active substances, very stable dispersions or true solutions. These true solutions are generally obtained with substances which are liquid at ambient temperature and practically insoluble in water and obviously with water-soluble substances, as well as with certain solid substances which are themselves practically insoluble in water. The latter fact is particularly surprising. Thus, true solutions are obtained, particularly with ethoxyquine, butylhydroxyanisole, diphenylamine and chlorophenylisopropyl carbamate and dispersions with substances such as iprodione and thiabendazole.

The pH of the aqueous compositions according to the invention can be adjusted to a value of 6 to 8 so as not to spoil the fruits and vegetables treated.

In order that the invention may be more fully understood, a number of examples are described below, purely by way of non-limiting illustration.

In the examples constituting these embodiments, the parts and percentages are by weight, except where there is indication to the contrary.

EXAMPLE 1

A dispersion is prepared having the following composition:

| | |
|---|---|
| Ethoxyquine (oily liquid) | 5.5% |
| Ethoxylated oleic acid (10 moles)* | 7% |
| " (6 moles)* | 7% |
| Water | 80.5% |

*The parenthetical expression refers to the number of moles of ethylene oxide condensed with one mole of oleic acid.

Into a storage chamber containing the stacked boxes of apples, this dispersion is sprayed in the form of a fine mist by means of a thermal fogging apparatus named the Dyna Fog DH 120 of the Curtis Dyna Products Corp. Company. An output temperature of 80° C. and a relatively fine mist is obtained.

A coating of each fruit by ethoxyquine is obtained ensuring good preservation of the fruit.

EXAMPLE 2

A solution is prepared by mixing the following constituents:

| | |
|---|---|
| Ethoxyquine | 15% |
| Oleic acid | 25% |
| Caustic potash | 3% |
| Propylene glycol | 40% |
| Water | 17% |

This solution is sprayed like in Example 1 with a Dyna Fog DH 120 apparatus. An output temperature of 120° C. and a very fine mist are obtained.

With this composition a particularly satisfactory coating is obtained.

EXAMPLE 3

A solution is prepared by mixing the following constituents:

| | |
|---|---|
| Diphenylamine | 10% |
| Oleic acid | 25% |
| Caustic potash | 3% |
| Propylene glycol | 30% |
| Ethoxylated oleic acid (10 moles)* | 5% |
| Ethoxylated oleic acid (6 moles)* | 15% |
| Water | 12% |

*The parenthetical expression refers to the number of moles of ethylene oxide condensed with one mole of oleic acid.

This solution is sprayed by operating as in Example 2 and a particularly satisfactory coating is obtained.

EXAMPLE 4

A stable dispersion is prepared by mixing the following constituents:

| | |
|---|---|
| Thiabendazole | 10% |
| Oleic acid | 23% |
| Caustic potash | 2.4% |
| Propylene glycol | 46% |
| Water | 18.6% |

This dispersion is sprayed by operating as in Example 2. A very satisfactory coating is is obtained.

EXAMPLE 5

A solution is prepared by mixing the following constituents:

| | |
|---|---|
| Sec. Butylamine | 10% |
| Sulfuric acid | 5% |
| Oleic acid | 25% |
| Propylene glycol | 40% |
| Water | 20% |

The sec. butylamine serves, on the one hand, as active substance in the form of sulfate and, on the other hand, to neutralise a part of the oleic acid.

This solution is sprayed by operating as in Example 2 and a satisfactory coating is obtained.

The advantages obtained by means of the present invention are as follows:

(1) The fruits and vegetables do not undergo any mechanical damage, although this is the case with the machines traditionally used for the application of fungidical substances.

(2) After harvesting, the fruits are no longer handled, except when they are sent on to the markets.

(3) It is no longer necessary to purchase expensive equipment for application of treatment substances.

(4) The time of application of such products is very rapid. In fact, it is possible to treat 1,000 tons of fruit or vegetables in 20 hours at the maximum period. It is possible in addition to treat at the same time several chambers by means of several apparatuses.

(5) It is possible to treat with low doses, as the case may be, by repeating the treatments in the case of long preservation.

(6) The maintenance of the fruit and vegetables at ambient temperature is eliminated, because they are immediately stored in a cold chamber awaiting treatment.

(7) The phenomenon of intercontamination by accumulation in the treatment water of contamination agents such that the products used do not permit them to be removed, is eliminated.

(8) Accurate dosage of the treatment products is obtained when the exact volume of the chambers is known, independently of the interval between the preparation of the mixture and the treatment, the more or less considerable presence of water on the fruits and the different absorption values of different products by the skin of the treated fruit. Thus, there is no phenomenon of impoverishment of the solution, as happens in traditional methods, for example, by dipping.

(9) A more regular coating of the fruit and vegetables is obtained than in using conventional techniques by immersion or spraying, for which the surface concentrations of processing products vary as a result of sedimentation phenomena (immersion), insufficient wetting (spraying), dilution, if the fruits are wet, or progressive absorption by the treated fruits and vegetables. This homogeneity of the coating enables the use of lower doses of active substances, and hence reduction of the residual doses of these active substances.

(10) The lifespan of wooden boxes is increased, since the boxes are not exposed to the damaging action of water, with often an uncontrolled growth of saprophytic fungi. Thus, an appreciable economy is obtained.

(11) The yield calculated with respect to the active substance is much improved. In fact, whereas in using immersion, the yield is only of the order of 3%, with the present invention the yield can reach 40%.

What is claimed is:

1. A composition for the treatment of fruit and vegetables, comprising, in solution form,
    from 2% to 20% by weight of active substance selected from ethoxyquine, butylhydroxyanisole, diphenylamine and chlorophenyl isopropyl carbamate
    from 10% to 20% by weight of water
    from 25% to 50% of propylene glycol, and
    from 5% to 50% by weight of a mixture of emulsifiers each having an HLB value of 3 to 20, and said mixture having an average HLB value of 10 to 15 and comprising from 8% to 12% by weight of fatty acid and from 14% to 18% by weight of a fatty acid salt.

2. A composition according to claim 1 wherein the fatty acid is oleic acid.

3. A composition according to claim 1 wherein the active substance is diphenylamine.

4. A method of treating fruits and vegetables comprising applying in an enclosure containing fruits and vegetables, by thermal fogging, a composition according to claim 1.

* * * * *